C. L. ROYER & J. W. MURPHY.
SKID CHAIN APPLIANCE.
APPLICATION FILED JAN. 30, 1917.
1,248,724.
Patented Dec. 4, 1917.
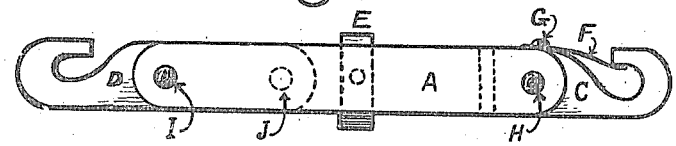
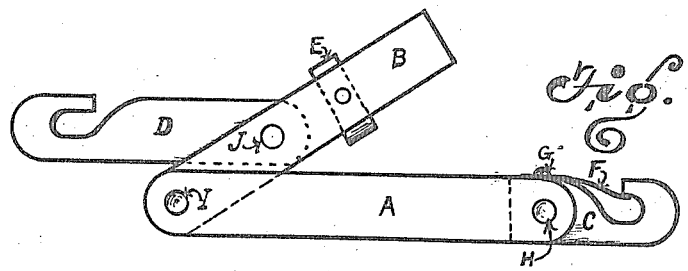
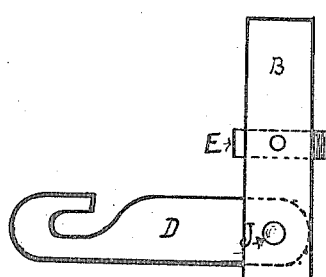
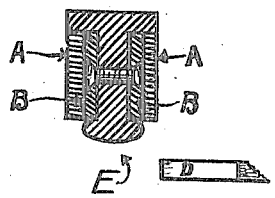
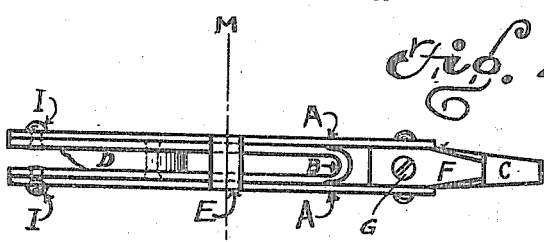
Inventors
Curtis L. Royer
John W. Murphy
By Moulton & Luriance
Attorneys.

UNITED STATES PATENT OFFICE.

CURTIS L. ROYER AND JOHN W. MURPHY, OF GRAND RAPIDS, MICHIGAN.

SKID-CHAIN APPLIANCE.

1,248,724.

Specification of Letters Patent.

Patented Dec. 4, 1917.

Application filed January 30, 1917. Serial No. 145,432.

*To all whom it may concern:*

Be it known that we, CURTIS L. ROYER and JOHN W. MURPHY, citizens of the United States of America, residing at Grand Rapids, in the county of Kent and State of Michigan, have invented certain new and useful Improvements in Skid-Chain Appliances; and we do hereby declare the following to be a full, clear, and exact description of the invention, such as will enable others skilled in the art to which it appertains to make and use the same.

This invention relates to a device by means of which slack may be taken up in chains or the ends of chains connected together and is specially useful in attaching and taking up slack in non-skid chains applied to wheels of motor vehicles, though it is to be understood that it is not limited to such particular use. It is an object and purpose of the invention to provide a device of this character of economical and durable construction by means of which the tightening or fastening of all forms of non-skid chains for motor vehicle wheels may be readily effected. A further object of the invention consists in novel features of construction by means of which after the tightening or fastening of the chains has been effected, the device is locked in position so that it cannot readily become disengaged.

For an understanding of the construction which these ends together and many others are attained, reference may be had to the accompanying drawing in which:

Figure 1 is a side elevation of the device as it appears after the tightening or fastening of a chain has been accomplished.

Figs. 2 and 3 are similar elevations showing different positions of the parts during the tightening or fastening operation.

Fig. 4 is a plan view of the construction shown in Fig. 1, with parts broken away, and Fig. 5 is a section, somewhat enlarged, on the line M—M of Fig. 4.

Like reference characters refer to like parts throughout the several views of the drawing.

In construction, the device includes two side bars A of spring material between one end of which a hook C is pivotally mounted on pin H. This hook may, if desired, be provided with a retaining tongue or snap F secured thereto in any suitable manner as by rivet G. The side bars A are spaced a short distance apart and at their opposite end a lever B is pivotally mounted, being formed of single piece of metal bent substantially at its middle, the ends of which are pivotally connected at I to the ends of the sides A as shown. A short distance from pivots I a second hook D is pivotally mounted on pin J between the sides of the lever B and a short distance from the pivot J, a locking member E is permanently secured between the sides of the lever B one end thereof, as shown, being rounded on the sides to pass between and spread the sides A apart when the lever B is forced in between the sides. At its other end the member E is widened and formed with a head so as to stop the movement of the lever beyond the position where it is received between the sides A.

Referring to Fig. 3 this is a position of the parts after or when the hooks have been attached to the links of a chain for taking up the slack or fastening the same. With the movement of the lever B toward the bars A it will be noted that a very strong force may be exerted to tighten and draw the links of the chain which are engaged by the hooks toward each other. The final movement of the lever B to place between the sides A forces the locking member E between said sides until stopped by the head of member E the lever B thereupon being practically locked in place with the hooks C and D in alinement. The locking of the lever to the sides A is positive enough to hold the lever and bars together with straight pull which is exerted between the hooks but may be easily disengaged by pressure against the end of member E by reason of the rounded character of said end.

From the foregoing it will be apparent that we have produced a chain connector or tightener of very simple construction and one in which great force may be exerted if necessary to tighten the slack chains. This device is very useful in connecting the ends of chains and at the same time taking up such slack as there may be therein, this being of special utility in applying non-skid chains to motor vehicles. The construction consists of few parts and is very economically manufactured and is very durable in actual service. Various changes in minor detail of construction may be made without departing from the invention; for instance the chain engaging devices need not necessarily be hooks as shown but may be any equivalent parts. Accordingly we do not wish to be limited to the exact form shown but consider ourselves entitled to all modifications falling within the terms of the claims which define the invention.

We claim:

1. In combination, a pair of spaced apart flat bars of spring material, a device adapted to connect with a chain link secured between said bars at one end thereof, a lever comprised of a strip of metal bent into substantially U-shape having the ends of the legs thereof pivotally connected on the inner sides of and at the other end of said bars, a second device adapted to engage with a chain link pivotally mounted between the sides of the lever a short distance from its point of pivotal connection to the bars, and a friction locking member secured between the sides of the lever having a head at one end adapted to spring the bars apart to pass the head, and at the opposite end with a second head to stop the lever when it is located between the bars.

2. In combination, a pair of spaced apart resilient bars, a hook lying between the bars and connected thereto at one end, a lever comprised of a U-shaped member having the ends of the legs thereof lying on the inner sides of said bars and pivotally connected thereto at the opposite end, a second hook pivotally connected to the lever and lying between its sides, and a locking member secured to the lever adapted to frictionally engage with the bars and yieldingly lock the lever and bars together with the lever located between said bars.

3. In combination, a member including spaced apart sides, a link engaging device pivotally connected to the member at one end, a lever pivotally connected to the member at the opposite end and lying between the sides thereof, a link engaging member pivotally connected to the lever, and a friction lock on the lever adapted to engage with the sides of said member when the lever is moved to position between said sides.

4. In combination, a pair of spaced apart resilient flat bars, chain link engaging means positioned between the bars at one end thereof and pivotally connected thereto, a U-shaped member formed of flat metal having the ends of the legs thereof pivotally connected to the opposite ends of said bars and positioned on the inner sides thereof, a second chain link engaging member lying between the sides of said U-shaped member and pivotally connected thereto at a distance from the pivotal connection of said member to the bars and a friction locking member positioned between the sides of the U-shaped member a distance from the second link engaging member, and provided with a head adapted to force the bars apart to pass said head and pass therebetween, the head engaging against the edges of the bars to prevent accidental disconnection of the U-shaped member from the bars when turned to operative position, substantially as described.

In testimony whereof we affix our signatures.

CURTIS L. ROYER.
JOHN W. MURPHY.

Copies of this patent may be obtained for five cents each, by addressing the "Commissioner of Patents, Washington, D. C."